United States Patent
Martin et al.

(10) Patent No.: US 10,427,668 B2
(45) Date of Patent: Oct. 1, 2019

(54) ENGINE OIL DILUTION CONTROL IN A HYBRID VEHICLE

(71) Applicant: FORD GLOBAL TECHNOLOGIES, LLC, Dearborn, MI (US)

(72) Inventors: Douglas Raymond Martin, Canton, MI (US); Kenneth James Miller, Canton, MI (US); Ted Haladyna, Northville, MI (US); Aed M. Dudar, Canton, MI (US); Robert David Hancasky, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 15/470,132

(22) Filed: Mar. 27, 2017

(65) Prior Publication Data
US 2018/0273015 A1    Sep. 27, 2018

(51) Int. Cl.
| | |
|---|---|
| *F02D 19/08* | (2006.01) |
| *F02D 41/00* | (2006.01) |
| *F02D 41/06* | (2006.01) |
| *F02D 41/22* | (2006.01) |
| *F01M 1/16* | (2006.01) |
| *F02P 5/15* | (2006.01) |
| *B60W 10/06* | (2006.01) |

(52) U.S. Cl.
CPC ........... *B60W 10/06* (2013.01); *F01M 1/16* (2013.01); *F02D 19/084* (2013.01); *F02D 41/0025* (2013.01); *F02D 41/068* (2013.01); *F02P 5/1506* (2013.01); *F02D 2041/224* (2013.01); *F02D 2200/06* (2013.01); *F02D 2250/11* (2013.01)

(58) Field of Classification Search
None
See application file for complete search history.

(56) References Cited

U.S. PATENT DOCUMENTS

| | | | | |
|---|---|---|---|---|
| 5,382,942 | A * | 1/1995 | Raffa | F01M 11/10 340/438 |
| 7,552,705 | B2 * | 6/2009 | Serkh | B60K 6/28 123/179.4 |
| 9,109,481 | B2 | 8/2015 | Martin et al. | |
| 9,394,843 | B2 | 7/2016 | Hakeem et al. | |
| 9,403,427 | B2 | 8/2016 | Haladyna et al. | |
| 9,415,762 | B2 | 8/2016 | Treharne et al. | |
| 9,470,173 | B2 | 10/2016 | Lehmen et al. | |
| 2003/0200952 | A1 * | 10/2003 | Ito | F02D 41/047 123/305 |
| 2003/0200958 | A1 * | 10/2003 | Ito | F02D 41/00 123/520 |
| 2007/0131193 | A1 * | 6/2007 | Takahashi | F01M 1/18 123/196 AB |

(Continued)

*Primary Examiner* — Hung Q Nguyen
*Assistant Examiner* — Brian P Monahon
(74) *Attorney, Agent, or Firm* — David B. Kelley; Brooks Kushman P.C.

(57) ABSTRACT

A vehicle includes an engine and a controller programmed to, responsive to an estimated oil dilution level of the engine exceeding a first threshold, issue commands such that regenerative braking is inhibited to increase a temperature of the engine, and responsive to the estimated oil dilution level falling below the first threshold, discontinue issuing the commands.

18 Claims, 3 Drawing Sheets

(56) References Cited

U.S. PATENT DOCUMENTS

| | | | |
|---|---|---|---|
| 2007/0245983 A1* | 10/2007 | Igarashi | F01M 13/04 123/41.1 |
| 2008/0167788 A1 | 7/2008 | Tate et al. | |
| 2008/0264359 A1* | 10/2008 | Marsh | F01M 5/002 123/41.33 |
| 2008/0283019 A1* | 11/2008 | Arakawa | F01M 1/10 123/196 R |
| 2009/0283364 A1* | 11/2009 | Throop | F01M 5/001 184/6.22 |
| 2010/0250039 A1* | 9/2010 | Bryan | B60W 30/1882 701/22 |
| 2011/0166767 A1* | 7/2011 | Kurtz | F01N 9/002 701/103 |
| 2012/0042845 A1* | 2/2012 | Kanai | F01M 1/10 123/196 AB |
| 2012/0095644 A1* | 4/2012 | Dessirier | B60L 11/005 701/36 |
| 2012/0109498 A1* | 5/2012 | Murase | F02D 41/0025 701/103 |
| 2013/0190954 A1* | 7/2013 | Abihana | B60W 10/06 701/22 |
| 2013/0268182 A1* | 10/2013 | Treharne | F02N 11/0829 701/113 |
| 2014/0058647 A1* | 2/2014 | Haladyna | B60K 6/48 701/104 |
| 2015/0204263 A1* | 7/2015 | DeAngelis | F02D 41/40 123/478 |
| 2015/0367835 A1* | 12/2015 | Ikedaya | B60W 20/14 701/22 |
| 2016/0312670 A1* | 10/2016 | Quix | F01M 11/0004 |
| 2017/0009684 A1* | 1/2017 | Kawamura | B60W 20/00 |

* cited by examiner

ENGINE OIL DILUTION CONTROL IN A HYBRID VEHICLE

TECHNICAL FIELD

The present disclosure relates to a control strategy in a hybrid vehicle that controls engine oil dilution.

BACKGROUND

Hybrid electric vehicles (HEVs) may include an internal combustion engine and a traction motor to provide power to propel the vehicle. Fuel and water may accumulate in the engine lubricating oil due to infrequent operation of the engine and/or the type of engine used in the vehicle.

SUMMARY

According to one embodiment, a vehicle includes an engine and a controller programmed to, responsive to an estimated oil dilution level of the engine exceeding a first threshold, issue commands such that regenerative braking is inhibited to increase a temperature of the engine, and responsive to the estimated oil dilution level falling below the first threshold, discontinue issuing the commands.

According to another embodiment, an engine oil dilution control method includes, by a controller, responsive to an estimated oil dilution level of an engine exceeding a first threshold, operating by the controller an electric heater configured to heat coolant for the engine to increase a temperature of the coolant until the estimated oil dilution level falls below the first threshold.

According to another embodiment, a vehicle includes an engine and a controller programmed to, responsive to an estimated oil dilution level of the engine exceeding a first threshold, operate valves to direct coolant exiting the engine so as to bypass a radiator and recirculate the coolant through the engine to increase a temperature of the engine, and responsive to the estimated oil dilution level falling below the first threshold, operate the valves to direct the coolant through the radiator.

According to another embodiment, a vehicle includes an engine and a controller programmed to, responsive to an estimated oil dilution level of the engine exceeding a first threshold, issue commands such that interior cabin heating is inhibited to limit transfer of heat from a coolant of the engine until the estimated oil dilution level falls below the first threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
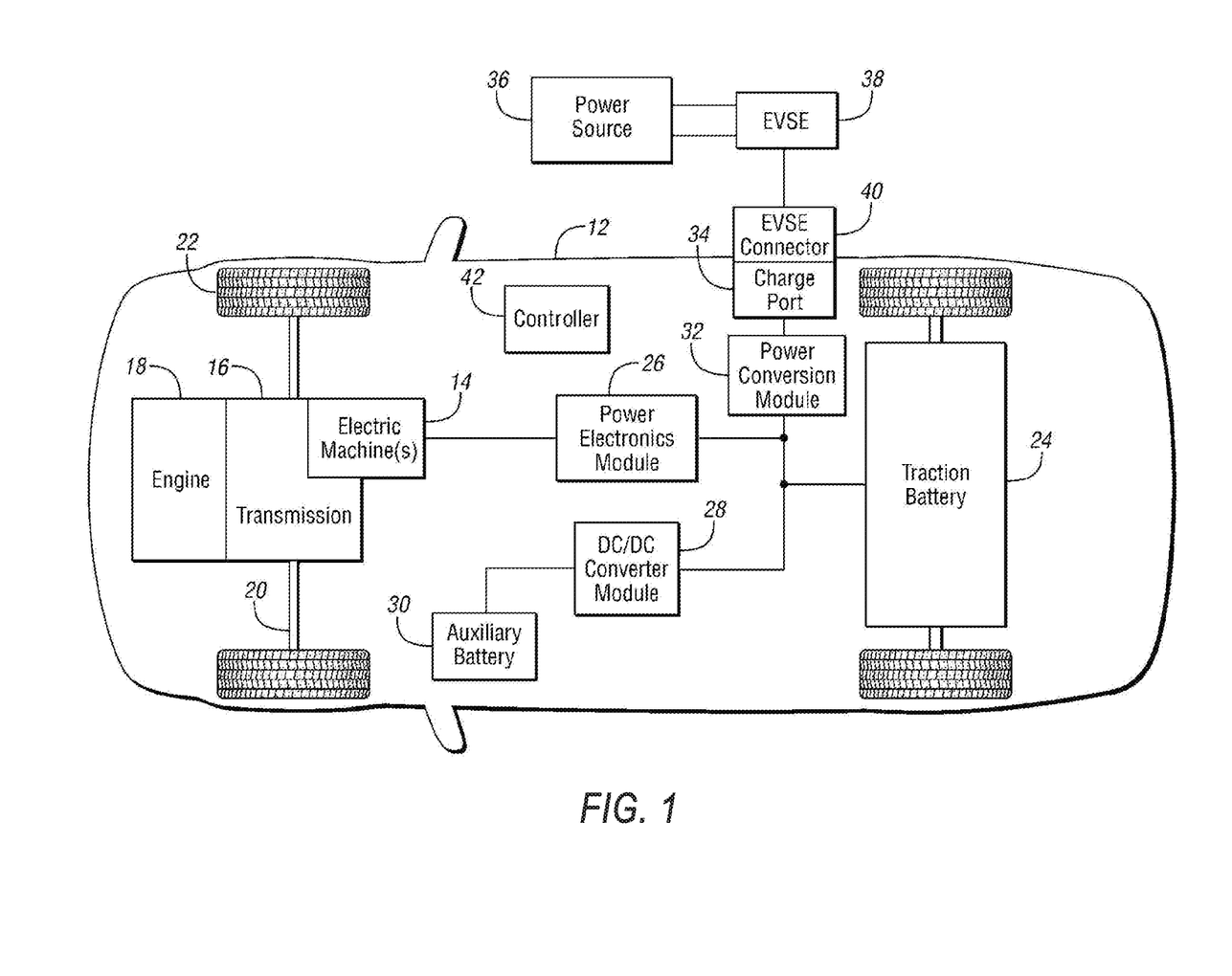
FIG. 1 depicts a plug-in hybrid-electric vehicle (HEV) in accordance with an embodiment of the instant disclosure.

FIG. 1 depicts a plug-in hybrid-electric vehicle (HEV) 12. Although FIG. 1 depicts a plug-in vehicle 12, the instant disclosure may be implemented on a non-plug-in hybrid-electric vehicle in accordance with other embodiments. The vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically connected to one or more power electronics modules. One or more contactors (not shown) may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example and without limitation, the battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules. Different signals may be transferred over different channels of the vehicle network. For example and without limitation, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 42 may be present to coordinate the operation of the various components.

The controller 42 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 42 communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. The controller 42 may communicate signals to and/or from engine 18, electric machines(s) 14, transmission 16, and power electronics module 26, for example. Although not explicitly illustrated, those of ordinary skill in the art will recognize various functions or components that may be controlled by the controller 42 within each of the subsystems identified above. Representative examples of parameters, systems, and/or components that may be directly or indirectly actuated using control logic executed by the controller 42 include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, electric machine operations, clutch pressures, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch status (TCC), deceleration or shift mode (MDE), for example.

Control logic or functions performed by controller 42 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 42. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 2:
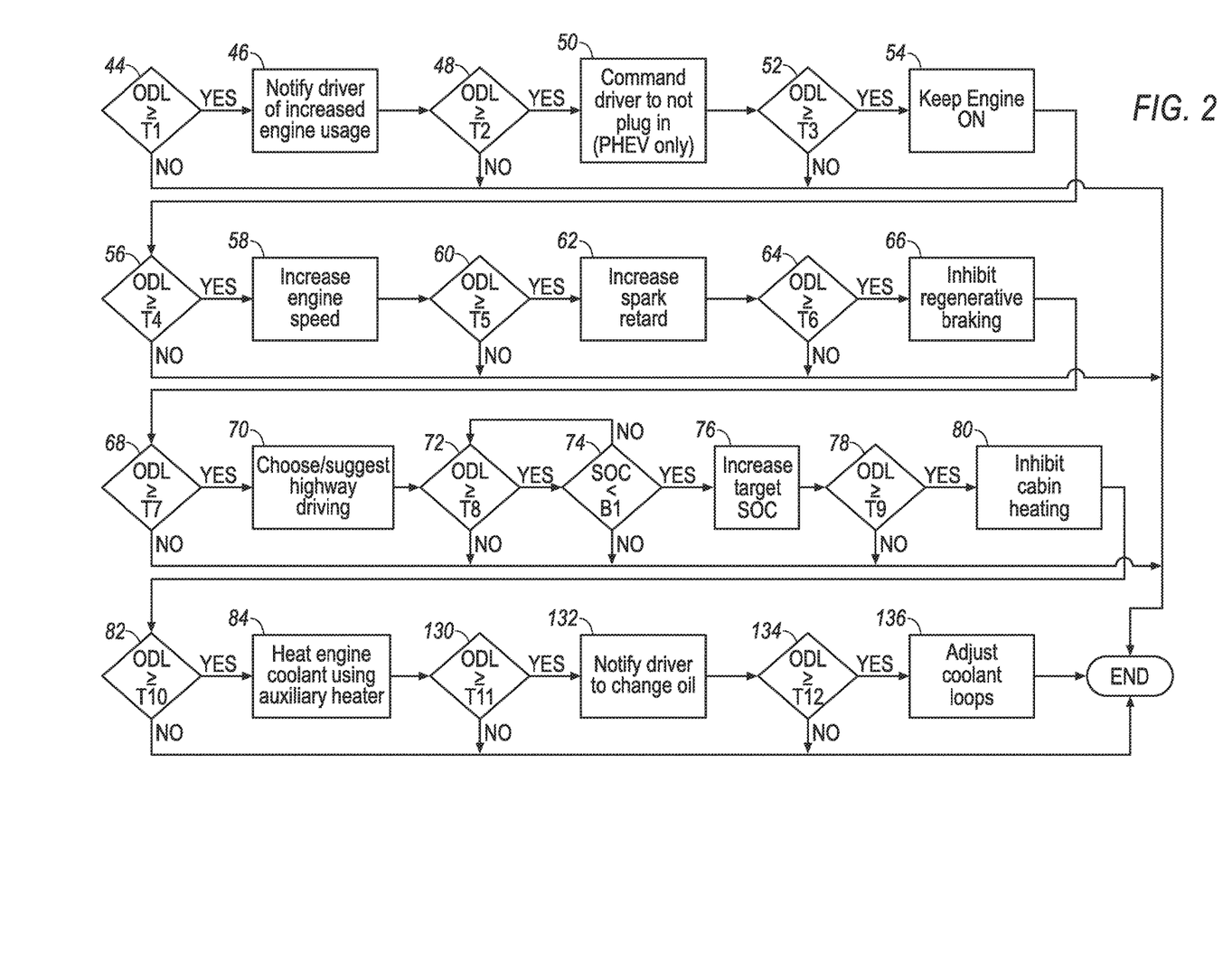
FIG. 2 illustrates a flowchart representing one embodiment of an algorithm implemented by a controller of the vehicle of FIG. 1 for controlling oil dilution.

FIG. 2 illustrates a flowchart representing one embodiment of an algorithm implemented by the controller 42 of the vehicle 12 of FIG. 1 for controlling engine oil dilution. As discussed in U.S. Pat. No. 9,403,427, which is hereby incorporated by reference in its entirety as though fully set forth herein, operation of the engine 18 may be adjusted based on fuel age and water and/or fuel dilution in the engine lubricating oil (engine oil dilution). In plug-in hybrid-electric vehicles, such as vehicle 12, engine operation and engine hot starts may be lower due to frequent charging of an on-board energy storage device (e.g., battery 24) and higher usage of electric machine(s) 14 to propel the vehicle 12. In some embodiments, the controller 42 may be programmed to intentionally operate the engine 18, even though the battery 24 may have sufficient charge, to deplete stale fuel and/or reduce engine oil dilution. The controller 42 may further be programmed to adjust (e.g., initiate or extend) a duration of engine operation, as well as a target temperature of engine operation (e.g., engine hot start or cold start) based on an oil dilution clean-out history and a stale fuel clean-out history of the vehicle 12. The controller 42 may estimate and update a fuel age and an oil dilution based on various vehicle and engine events.

In some embodiments, the controller 42 may be programmed to determine an amount of dilution of engine lubricating oil with fuel and/or water (e.g., an estimated oil dilution level of the engine 18) over the course of vehicle operation. The estimated oil dilution level may be based on engine temperatures during engine operation and a duration of engine operation at the engine temperatures. For example and without limitation, the estimated engine oil dilution may be based on a monitor or counter that is adjusted based on whether the engine 18 incurred a hot start or a cold start. The counter may be increased in response to an engine cold start (since a higher frequency of cold starts may add fuel and water to the oil) while the counter is decreased in response to an engine hot start (since a higher frequency of hot starts may remove fuel and water from the oil). The estimated oil dilution level may be further adjusted based on an oil change interval. For example and without limitation, in response to an operator getting an oil change service performed, the counter may be reset to indicate no engine oil dilution. In further embodiments, the estimated oil dilution level may also be based on a level or amount of the engine oil (as determined, for example, by a crankcase dipstick), a total distance traveled since the last engine oil change (e.g., as indicated by the odometer), and/or a total fuel consumed since the last oil change (e.g., as indicated by a fuel usage sensor).

In one embodiment, the controller 42 may monitor the distance traveled per day by the vehicle 12 (e.g., actual or average) and a percentage of that distance in engine mode relative to electric mode. The controller may then use that distance and percentage to calculate the estimated oil dilution level. The controller 42 may also monitor the fuel consumed per day by the vehicle 12 versus the distance traveled per day by the vehicle 12 to determine the estimated oil dilution level. With respect to temperature of the engine 18, the controller 42 may monitor the engine temperature during engine mode of operation to determine what temperature the engine 18 is operated at and how long the engine 18 is operated at that temperature. The controller 42 may also monitor a number of engine cold-starts relative to engine hot-starts during vehicle travel in engine mode, and calculate the estimated oil dilution level accordingly. Once the estimated oil dilution level is determined, it may be compared to a number of thresholds (T1-T12 in the illustrated embodiment), wherein exceeding each threshold causes the vehicle 12 to respond in a way that raises a temperature of the engine 18 and/or a temperature of an engine coolant to evaporate the water and/or fuel in the engine oil. In the illustrated embodiment, the thresholds increase in value with T1 being the lowest threshold, and T12 being the greatest threshold. The vehicle responses may become more aggressive in heating the engine and/or coolant, as the thresholds (T1-T12) increase. The vehicle responses may also become more inconvenient or intrusive to the operator or vehicle 12 as the thresholds increase.

The method illustrated in FIG. 2 may begin with the step 44 of determining whether the estimated oil dilution level (ODL) exceeds a threshold, T1. If at step 44, the controller 42 determines that the ODL exceeds T1, the method may continue with the step 46 of notifying the operator/driver of increased engine usage to evaporate water from the oil. In some embodiments, the controller 42 is programmed to, responsive to the ODL exceeding T1, issue an alert of increased engine usage via illumination of an indication light or display of a message on the vehicle dashboard. Such notification informs the operator of forthcoming vehicle responses that may otherwise be interpreted as poor fuel economy or vehicle malfunction. The controller 42 may further be programmed to, responsive to the ODL falling below T1, discontinue issuing the alert of increased engine usage. The alert may be displayed for as long as the ODL exceeds T1.

The method may continue with the step 48 of determining whether the ODL exceeds a threshold, T2, that is greater than T1. If at step 48, the controller 42 determines that the ODL exceeds T2, the method may continue with the step 50 of commanding the driver/operator to not plug in the vehicle 12 (if the vehicle is a plug-in vehicle). In some embodiments, the controller 42 is programmed to, responsive to the ODL exceeding T2, issue an alert to not recharge the battery 24 via an electrical power source 36 external to the vehicle 12 until the ODL falls below T2. By not recharging the battery via the electrical power source 36, operation of the engine 18 may increase. As operation of the engine 18 increases, the temperature of the engine 18 may increase, which may result in evaporation of water in the oil.

The method may continue with the step 52 of determining whether the ODL exceeds a threshold, T3, that is greater than T2. If at step 52, the controller 42 determines that the ODL exceeds T3, the method may continue with the step 54 of keeping the engine 18 on. In one embodiment, the controller 42 may be programmed to, responsive to the ODL exceeding T3, inhibit engine pull-downs to increase engine operation. Upon the ODL exceeding T3, the controller 42 may further be programmed to issue an alert of increased engine usage. The controller 42 may further be programmed to, responsive to the ODL falling below T3, discontinue inhibiting engine pull-downs.

The method may continue with the step 56 of determining whether the ODL exceeds a threshold, T4, that is greater than T3. If at step 56, the controller 42 determines that the ODL exceeds T4, the method may continue with the step 58 of increasing a speed of the engine 18 for a given power request. In one embodiment, the controller 42 may activate a look-up table with a higher engine RPM for a given power request. There may be a number of lookup tables and/or algorithms that determine engine speed and torque based on a requested or required engine power. The tables and/or algorithms may also be configured to determine the balance of engine and battery power to achieve a vehicle power request. By increasing engine speed, the temperature of the engine 18 may increase which may result in evaporation of the water in the oil. The controller 42 may be programmed to, responsive to the ODL exceeding T4, increase a speed of the engine 18 for a given power request until the ODL falls below T4. Upon the ODL exceeding T4, the controller 42 may further be programmed to issue an alert of increased engine speed.

The method may continue with the step 60 of determining whether the ODL exceeds a threshold, T5, greater than T4. If at step 60, the controller 42 determines that the ODL exceeds T5, the method may continue with the step 62 of increasing an amount of spark retard. Spark timing adjustments may be used during engine starts to assist in raising engine temperatures (e.g., more retarded). In one embodiment, the amount of spark retard may be increased by ten to twenty degrees. The controller 42 may be programmed to, responsive to the ODL exceeding T5, increase an amount of spark retard to increase engine temperature until the ODL falls below T5. Upon the ODL exceeding T5, the controller 42 may further be programmed to issue an alert informing the operator that the engine will run harder to clean the oil.

The method may continue with the step 64 of determining whether the ODL exceeds a threshold, T6, that is greater than T5. If at step 64, the controller 42 determines that the ODL exceeds T6, the method may continue with the step 66 of inhibiting regenerative braking. The vehicle 12 may capture and store energy when the vehicle 12 is experiencing powertrain braking. The electric machine 14, which may be an electric motor, functions as a generator and absorbs energy generated as a result of the powertrain braking and converts the energy to electric energy which may be used to increase the state of charge of the battery 24. Regenerative powertrain braking may be desirable beyond recouping energy because the vehicle's energy may be dissipated with minimal or no negative torque supplied by the frictional wheel brakes, thus reducing wear on the frictional wheel brakes. By inhibiting regenerative braking, less electric energy is stored to power the electric machine 14. As such, engine usage may increase, which may result in increased engine temperature and, in turn, evaporation of water in the engine oil. The controller 42 may be programmed to, responsive to the ODL exceeding T6, issue commands such that regenerative braking is inhibited to increase the temperature of the engine 18. The controller may further be programmed to, responsive to the ODL falling below T6, discontinue issuing the commands. Upon the ODL exceeding T6, the controller 42 may further be programmed to issue an alert of increased engine usage.

The method may continue with the step 68 of determining whether the ODL exceeds a threshold, T7, greater than T6. If at step 68, the controller 42 determines that the ODL exceeds T7, the method may continue with the step 70 of choosing (for autonomous vehicles) or suggesting highway driving to provide longer periods of engine usage. In one embodiment, the controller 42 may be programmed to, responsive to the ODL exceeding T7, issue an alert or command to select a route with increased highway driving. The controller 42 may further be programmed to, responsive to the ODL falling below T7, discontinue issuing the alert or command. Upon the ODL exceeding T7, the controller 42 may further be programmed to issue an alert of increased engine usage and/or selected route with increased highway driving (for autonomous vehicles).

The method may continue with the step 72 of determining whether the ODL exceeds a threshold, T8, that is greater than T7. If at step 72, the controller 42 determines that the ODL exceeds T8, the method may continue with the step 74 of determining whether an operating state-of-charge of the battery 24 falls below a threshold, B1. If at step 74, the controller 42 determines that the operating state-of-charge does not fall below B1, the method may return to step 72 and wait until the operating state-of-charge does fall below B1 (or until the ODL falls below T8). If at step 74, the controller 42 determines that the operating state-of-charge does fall below B1, the method may continue with the step 76 of increasing a target state-of-charge of the battery such that the engine 18 operates to recharge the battery 24 to the target state-of-charge. For example and without limitation, the target state-of-charge may be increased from 30% to 90% such that the engine 18 operates to aggressively recharge the battery 24 to run the engine 18 at high power to evaporate water from the oil. The controller 42 may further be programmed to, responsive to the ODL falling below T8, decrease the target state-of-charge. In one embodiment, the target state-of-charge is decreased to its original value (30% in the example above). Upon the ODL exceeding T8, the controller 42 may further be programmed to issue an alert informing the operator that the engine will run harder to clean the oil. The controller 42 may also be programmed to increase a charging rate at which the engine 18 operates to recharge the battery 24 to the target state-of-charge.

The method may continue with the step 78 of determining whether the ODL exceeds a threshold, T9, that is greater than T8. If at step 78, the controller 42 determines that the ODL exceeds T9, the method may continue with the step 80 of inhibiting cabin heating. In one embodiment, the controller 42 is programmed to, responsive to the ODL exceeding T9, issue commands such that interior cabin heating is inhibited to limit transfer of heat from a coolant of the engine 18 until the ODL falls below T9. The issued commands may involve closing ducts and/or vents directing air to the floor and vents. The controller 42 may be programmed to, responsive to the ODL falling below T9, discontinue inhibiting cabin heating. In one embodiment, the controller 42 inhibits cabin heating of floor and vents, but not through the windshield vents to permit defrost. In another embodiment, the controller 42 reduces requested interior cabin heating instead of inhibiting. Upon the ODL exceeding T9, the controller 42 may further be programmed to issue an alert informing the operator that heat to cabin floor and vents is being reduced to help clean engine oil.

The method may continue with the step 82 of determining whether the ODL exceeds a threshold, T10, that is greater than T9. If at step 82, the controller 42 determines that the ODL exceeds T10, the method may continue with the step 84 of heating coolant flowing through the engine 18 using an auxiliary electric heater which is illustrated in FIG. 3.

Figure 3:
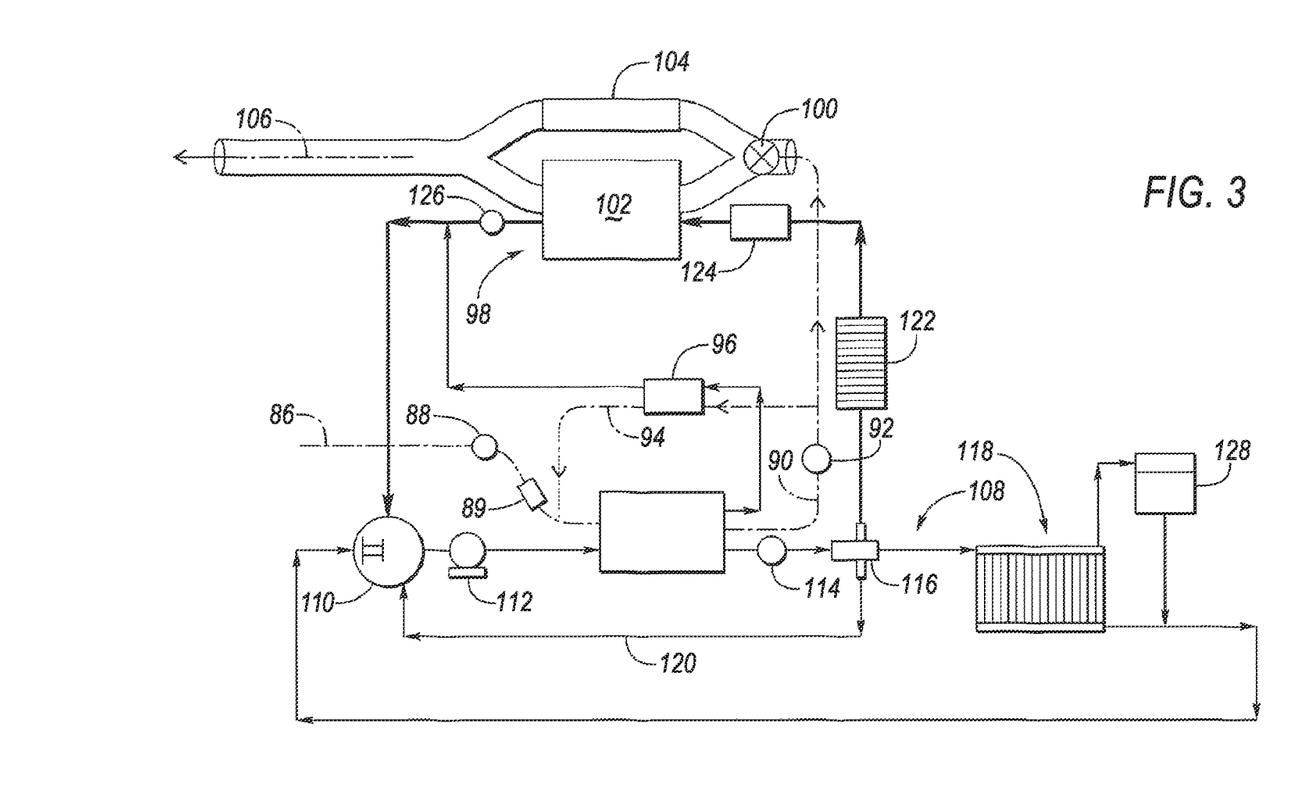
FIG. 3 is a flow diagram for a coolant circuit and an airflow circuit for an engine of the vehicle of FIG. 1 in accordance with an embodiment of the instant disclosure.

FIG. 3 is a flow diagram for a coolant circuit and an airflow circuit for the engine 18 of the vehicle 12 of FIG. 1 in accordance with an embodiment of the instant disclosure. U.S. Pat. No. 9,109,481, which is hereby incorporated by reference as though fully set forth herein, discloses a coolant and airflow circuit in connection with a method to control and diagnose an exhaust gas heat exchanger. One of ordinary skill in the art will understand that there may be other coolant and air flow circuits (with similar or different components) that may be utilized in accordance with the instant disclosure, other than the illustrated embodiment of in FIG. 3.

In FIG. 3, the coolant flow path is shown as a solid line, and the air flow path is shown as a dashed line. Referring to the air flow path first, the engine 18 receives air from the atmosphere from an intake 86. The incoming air flows through an air mass sensor 88, and then through a throttle valve 89 that controls the flow rate of the air to the engine 18. The air then flows through the engine 18, where it combusts with fuel when the engine 18 is running. After combustion, the exhaust gas 90, heated by the combustion process, exits the engine 18. Alternatively, the air may flow through an unfueled motored engine 18, where the air may be heated by any residual heat retained by the thermal capacity of the engine block and components.

Air or exhaust gas flows from the engine 18 through the exhaust 90 and is measured by an exhaust gas temperature (EGT) sensor 92. The exhaust gas then may follow one of two flow paths. Part of the exhaust gas may flow through an exhaust gas recirculation (EGR) loop 94, which recirculates the exhaust gas back to the intake manifold of the engine 18, where it mixes with fresh incoming air before entering the engine 18. The flow of the exhaust gas through the EGR loop 94 is controlled by an EGR valve 96.

Alternatively, the exhaust gas may flow through an exhaust gas heat exchanger system (EGHX) 98, through an emissions treatment system, such as a catalytic converter, and then exit to the atmosphere. The EGHX system 98 is configured to selectively exchange heat between the exhaust gas from the engine 18 and the coolant, as discussed below. The EGHX system 98 has an inlet valve 100, which may be a two-way valve. The inlet valve 100 directs the gas flow through either a heat exchanger unit 102, or through a bypass line 104 of the EGHX system 98. When the hot exhaust gas flows through the heat exchanger unit 102, it exchanges heat with coolant in the coolant system, as discussed below with respect to the coolant flow path. The gas then exits the EGHX system 98 by flowing from the heat exchanger unit 102 and/or the bypass 104 to an exhaust line 106 that feeds into an after-treatment system or the like.

Referring now to the coolant flow path for the coolant system 108, coolant enters and flows through a thermostat 110, and then through a water pump 112. The coolant exits the water pump 112 and flows through coolant passages in the engine 18. The coolant may act to cool the engine 18 if the coolant temperature is lower than the temperature of the engine 18. Alternatively, the coolant may act to warm the engine 18 if the coolant temperature is higher than the temperature of the engine 18, such as may occur during an engine restart in a hybrid vehicle 12. In one embodiment, no coolant flow is provided when the pump 112 is not operating.

A portion of the coolant in the system 108 may flow through the EGR valve 96 to cool the EGR valve 96. The remainder of the coolant flows out of the engine 18 where the temperature is measured by an engine coolant temperature sensor (ECT) 114. The coolant then flows to a three-way splitter 116. The splitter 116 provides a passive control over the coolant flow. In other embodiments, splitter 116 may be replaced with a valve such that all coolant flow may be selectively directed through a radiator system 118.

The splitter 116 is configured to direct the coolant to at least two of three paths. Some coolant flows through a shunt line 120, where it returns to the inlet to the thermostat 110.

Coolant flows to a heat exchanger 122. The heat exchanger 122 may act as a heater for the HVAC system for interior cabin heating of the vehicle 12, and uses warm coolant to heat air for the passenger cabin or compartment of the vehicle. The heated air from the heat exchanger 122 is used, for example, in the HVAC system when the operator requests a heat setting on the HVAC for window defrost, etc. The coolant exits the heat exchanger 122 and flows to the EGHX system 98.

Upstream of the heat exchanger 122 may be an auxiliary electric heater 124. The electric heater 124 may be a heat source to provide heat for the hybrid electric vehicle 12 or to supplement heat from the engine 18 when engine waste heat is insufficient to meet a heating demand for the interior cabin. The electric heater 124 may generally contain one or more heating elements that function as electrical resistors that convert electricity to heat. The electric heater 124 may include a thermostat to regulate the heat output. Alternatively, the electric heater 124 may include Positive Temperature Coefficient (PTC) heating elements. PTC heating elements are made of small ceramic stones that have an increasing electrical resistance as temperature increases to provide self-limiting temperature properties such that a thermostat may not be needed. In addition, PTC heaters have fast heating response times and the ability to automatically vary resistance and associated current/power to maintain a pre-defined temperature. In another embodiment, the electric heater 124 is downstream of the heat exchanger 122.

Upon exiting the heat exchanger 122, the coolant enters the EGHX unit 102 of the EGHX system 98. Within the EGHX unit 102, the coolant and the exhaust gas are configured to exchange heat. If exhaust gas is flowing through the EGHX unit 102, heat may be exchanged between the two mediums such that the coolant temperature is increased by the exhaust gas temperature. After the coolant leaves the EGHX unit 102, the coolant temperature is measured by a heat exchanger coolant temperature sensor (HECT) 126 that is either incorporated into the EGHX system 98 or is positioned in a coolant line downstream of the EGHX system 98. The coolant then flows back to the inlet of the thermostat 110.

The coolant flows through the EGHX system 98 loop for various reasons. For example, interior cabin heat may be required for the HVAC, and the coolant has a sufficient temperature to heat the interior cabin air in heat exchanger 122. The coolant temperature may be low and hot exhaust is available from the engine 18 to heat the coolant in the EGHX unit 102. Coolant flowing through the EGHX system 98 may be heated at a faster rate than using the engine 18 alone during an engine restart, for example, in a hybrid vehicle 12 after the engine 18 has been off for a period of time.

The various heat exchangers in the vehicle may be any type of heat exchanger as is known in the art, including co-flow, counter-flow, cross flow, and the like.

When the thermostat 110 is open, the coolant flows through the radiator system 118, which lowers the temperature of the coolant by passing the coolant through a heat exchanger in contact with the environment. The cooled coolant then flows from the radiator system 118 back to the thermostat 110. The flow path through the radiator may be used to lower the coolant temperature and in turn lower the engine temperature. The shunt 120 flow may vary based on whether coolant is also flowing through the radiator system 118.

The coolant system 108 may have a reservoir (not shown) where coolant accumulates when it is not flowing through a cooling line or system connected to the cooling lines, and additionally the coolant system 108 may have a degas system with reservoir 128 for removing any air from the system 108.

The coolant may flow through the shunt 120 at all times. The shunt 120 allows for more coolant to circulate through engine 18 than can be accommodated by the heater core 122 path alone (i.e., when the radiator 118 path is closed by the thermostat 110). The coolant flows through the radiator 118 loop when the coolant temperature is high and lowering the coolant temperature is desired. A portion of the coolant may be also be directed in part through the EGR valve 96 loop when cooling of the EGR valve 96 is required.

The controller 42 (shown in FIG. 1) may control the operation of the system or may coordinate control of the system with a climate control computer or control module as previously described. The controller 42 may determine the heating mode based on the heat request and the status of the various components in the heating system and, in particular, the status of electric heater 124.

Referring back to FIG. 2, the controller 42 may be programmed to, responsive to the ODL exceeding T10, operate the electric heater 124 configured to heat coolant for the engine 18 until the ODL falls below T10.

The method may continue with the step 130 of determining whether the ODL exceeds a threshold, T11, that is greater than T10. If at step 130, the controller 42 determines that the ODL exceeds T11, the method may continue with the step 132 of issuing an alert to change engine oil. The alert may be in the form of a displayed messaged visible to the operator. The controller 42 may further be programmed to, responsive to the ODL falling below T11 and/or the engine oil being changed, discontinue issuing the alert.

The method may continue with the step 134 of determining whether the ODL exceeds a threshold, T12, that is greater than T11. If at step 134, the controller 42 determines that the ODL exceeds T12, the method may continue with the step 136 of adjusting the coolant loops to increase a temperature of the engine 18. In one embodiment and with reference to FIG. 3, the controller 42 may be programmed to, responsive to the ODL exceeding T12, operate valves (e.g., thermostat 110 and splitter 116) to direct coolant exiting the engine 18 so as to bypass a radiator 118 and recirculate the coolant through the engine 18 to increase a temperature of the engine 18. The controller may further be programmed to, responsive to the ODL falling below T12, operate the valves to direct the coolant through the radiator 118. There may be other conditions under which the controller 42 selectively directs coolant to the radiator 118. The coolant loops may be adjusted in other ways to increase the temperature of the engine 18. In one embodiment, if engine operation (during engine warm-up, for example) did not utilize the EGHX system 98, then the EGR heat exchanger could be bypassed until EGR was enabled to avoid routing coolant through a cold system. In another embodiment, a secondary coolant loop, such as one that includes a throttle body heater, may also be disabled to limit transfer of heat from the coolant and increase temperature of the engine.

In the illustrated embodiment, the ODL is continuously calculated and estimated and compared against the thresholds, T1-T12. And the algorithm is set up such that the controller 42 will perform all actions associated with the thresholds that the ODL exceeds. For example and without limitation, if the ODL exceeds T10, the controller 42 will perform all actions/responses associated with thresholds, T1-T10. If the ODL then decreases to a value between T6 and T7, then the controller 42 will discontinue the actions associated with T7-T10 but continue to perform all actions associated with T1-T6.

In other embodiments, more or less thresholds may be utilized in the engine oil dilution control method/algorithm. In one embodiment, the thresholds are expressed as percentages expressing the amount of water in the oil (e.g., a volume of water divided by a volume of oil, or a volume of water divided by a total volume of water and oil). For example and without limitation, T1 may be 2%, T12 may be 30%, and T2-T11 may be equally incremented percentages between T1 and T12. In other embodiments, there may be less thresholds, and the actions may be grouped together according to the thresholds. For example, if T4 of the illustrated embodiment was the first threshold prompting action/response, then the actions associated with T1-T4 of the illustrated embodiment may be performed in response to the ODL exceeding the first threshold, T4. In the illustrated embodiment, the ODL is based on the temperature of the engine, a number of engine cold starts, a number of engine hot starts, an oil change interval, or a fuel age. In other embodiments, the ODL may be determined in accordance with other methods or variables.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   an engine; and
   a controller programmed to,
      responsive to an estimated oil dilution level of the engine exceeding a first threshold, issue commands such that regenerative braking is inhibited to increase a temperature of the engine, and
      responsive to the estimated oil dilution level falling below the first threshold, discontinue issuing the commands.

2. The vehicle of claim 1, wherein the estimated oil dilution level is based on the temperature of the engine, a number of engine cold starts, a number of engine hot starts, an oil change interval, or a fuel age.

3. The vehicle of claim 1, wherein the controller is further programmed to,
   responsive to the estimated oil dilution level exceeding a second threshold less than the first threshold, issue an alert to not recharge a battery of the vehicle via an electrical power source external to the vehicle, and
   responsive to the estimated oil dilution level falling below the second threshold, discontinue issuing the alert.

4. The vehicle of claim 1, wherein the controller is further programmed to,
   responsive to the estimated oil dilution level exceeding a second threshold greater than the first threshold, issue an alert or command to select a route with increased highway driving, and
   responsive to the estimated oil dilution level falling below the second threshold, discontinue issuing the alert or command.

5. The vehicle of claim 1, further comprising a battery, wherein the controller is further programmed to,
   responsive to the estimated oil dilution level exceeding a second threshold greater than the first threshold, increase a target state-of-charge of the battery such that the engine operates to recharge the battery to the target state-of-charge, and
   responsive to the estimated oil dilution level falling below the second threshold, decrease the target state-of-charge.

6. The vehicle of claim 1, further comprising an electric heater configured to heat coolant for the engine, and wherein the controller is further programmed to, responsive to the estimated oil dilution level exceeding a second threshold greater than the first threshold, operate the electric heater to increase a temperature of the coolant, and
responsive to the estimated oil dilution level falling below the second threshold, turn off the electric heater.

7. An engine oil dilution control method comprising:
by a controller,
responsive to an estimated oil dilution level of an engine exceeding a first threshold, operating by the controller an electric heater configured to heat coolant for the engine to increase a temperature of the coolant until the estimated oil dilution level falls below the first threshold, and
responsive to the estimated oil dilution level exceeding a second threshold less than the first threshold, increasing by the controller a target state-of-charge of a battery such that the engine operates to recharge the battery to the target state-of-charge until the estimated oil dilution level falls below the second threshold.

8. The engine oil dilution control method of claim 7, further comprising,
by the controller,
responsive to the estimated oil dilution level exceeding a third threshold greater than the first threshold, operating valves to direct the coolant exiting the engine to bypass a radiator and recirculate the coolant through the engine, and
responsive to the estimated oil dilution level falling below the third threshold, operating the valves to direct the coolant through the radiator.

9. The engine oil dilution control method of claim 7, further comprising, by the controller, responsive to the estimated oil dilution level exceeding a third threshold less than the first threshold, issuing by the controller an alert to not recharge a battery via an external electrical power source until the estimated oil dilution level falls below the third threshold.

10. The engine oil dilution control method of claim 7, further comprising,
by the controller,
responsive to the estimated oil dilution level exceeding a third threshold less than the first threshold, issuing commands by the controller such that regenerative braking is inhibited to increase a temperature of the engine, and
responsive to the estimated oil dilution level falling below the third threshold, discontinuing the issuing.

11. The engine oil dilution control method of claim 7, wherein the estimated oil dilution level is based on a temperature of the engine, a number of engine cold starts, a number of engine hot starts, an oil change interval, or a fuel age.

12. A vehicle comprising:
an engine; and
a controller programmed to,
responsive to an estimated oil dilution level of the engine exceeding a first threshold, operate valves to direct coolant exiting the engine to bypass a radiator and recirculate the coolant through the engine to increase a temperature of the engine,
responsive to the estimated oil dilution level falling below the first threshold, operate the valves to direct the coolant through the radiator,
responsive to the estimated oil dilution level exceeding a second threshold less than the first threshold, issue an alert to not recharge a battery of the vehicle via an electrical power source external to the vehicle, and
responsive to the estimated oil dilution level falling below the second threshold, discontinue issuing the alert.

13. The vehicle of claim 12, wherein the estimated oil dilution level is based on the temperature of the engine, a number of engine cold starts, a number of engine hot starts, an oil change interval, or a fuel age.

14. The vehicle of claim 12, further comprising a battery, wherein the controller is further programmed to, responsive to the estimated oil dilution level exceeding a third threshold less than the first threshold, increase a target state-of-charge of the battery such that the engine operates to recharge the battery to the target state-of-charge until the estimated oil dilution level falls below the third threshold.

15. The vehicle of claim 12, wherein the controller is further programmed to, responsive to the estimated oil dilution level exceeding a third threshold less than the first threshold, operate an electric heater configured to heat coolant for the engine until the estimated oil dilution level falls below the third threshold.

16. The vehicle of claim 12, wherein the controller is further programmed to, responsive to the estimated oil dilution level exceeding a third threshold less than the first threshold, issue an alert to change engine oil until the estimated oil dilution level falls below the third threshold.

17. A vehicle comprising:
an engine; and
a controller programmed to, responsive to an estimated oil dilution level of the engine exceeding a first threshold, issue commands such that interior cabin heating is inhibited to limit transfer of heat from a coolant of the engine until the estimated oil dilution level falls below the first threshold.

18. The vehicle of claim 17, wherein the estimated oil dilution level is based on a temperature of the engine, a number of engine cold starts, a number of engine hot starts, an oil change interval, or a fuel age.

* * * * *